US005130189A

United States Patent [19]

Hart

[11] Patent Number: 5,130,189

[45] Date of Patent: Jul. 14, 1992

[54] IMAGABLE COPY FILM

[75] Inventor: Charles R. Hart, Cleveland, England

[73] Assignee: Imperial Chemical Industries PLC, London, England

[21] Appl. No.: 551,840

[22] Filed: Jul. 12, 1990

[30] Foreign Application Priority Data

Jul. 13, 1989 [GB] United Kingdom ................ 8916030

[51] Int. Cl.[5] .............................................. B32B 27/36

[52] U.S. Cl. ................................... 428/331; 428/481; 428/483; 428/486; 428/513; 428/910; 428/479.6; 428/419; 428/412; 427/108

[58] Field of Search ............... 428/331, 483, 486, 481, 428/910, 412, 513

[56] References Cited

U.S. PATENT DOCUMENTS

| | | | |
|---|---|---|---|
| 4,603,079 | 7/1986 | Nishizaki et al. | 428/323 |
| 4,701,367 | 10/1987 | Malhotra | 428/483 X |
| 4,711,816 | 12/1987 | Wittnebel | 428/483 X |
| 4,839,224 | 6/1989 | Chou et al. | 428/484 X |

FOREIGN PATENT DOCUMENTS 0315360 5/1989 European Pat. Off. .

*Primary Examiner*—P. C. Sluby

*Attorney, Agent, or Firm*—Cushman, Darby & Cushman

[57] ABSTRACT

An imagable copy film comprises a film substrate of a thermoplastics polymeric material with a percentage thermal expansion in the film widthwise direction (TD) at 150° C. of 0.01 to 1.0%, and a percentage thermal shrinkage in the film lengthwise direction (MD) at 150° C. of 0.4 to 2.0%. The substrate has a receiving layer on at least one surface thereof, comprising an acrylic and/or methacrylic resin.

8 Claims, No Drawings

IMAGABLE COPY FILM

IMAGABLE COPY FILM

This invention relates to an imagable copy film, and in particular to an electrostatically imagable copy film.

Transparencies for the projection of light images are known and can be formed from a transparent polymeric film base, and an image or print applied thereto by an electrostatic copying process. However, such electrostatic copying processes employ relatively high temperatures which can affect the curl and flatness of polymeric films. Japanese Unexamined patent application No. 63-11326 describes a low-distortion optical recording medium produced from an uncoated polyethylene terephthalate film.

In addition, electrostatically applied images may lack permanence, in the sense that they exhibit inferior resistance to abrasion and erasure during repeated handling and use, unless special measures are taken to develop adequate adhesion between the film base and the image layer. Similar problems are encountered with pigmented (white) or opaque copy or drafting films suitable for use in xerographic laser printer equipment or in wide format (841×1189 mm) copiers.

This invention is concerned with both improving the curl and flatness of electrostatically imagable film, and improving the adhesion to the film base of an image layer derived from a copying toner powder and applied by an electrostatic copying process.

Accordingly, the present invention provides an imagable copy film comprising a film substrate of a thermoplastics polymeric material with a percentage thermal expansion in the film widthwise direction (TD) at 150° C. of 0.01 to 1.0%, and a percentage thermal shrinkage in the film lengthwise direction (MD) at 150° C. of 0.4 to 2.0%, having, on at least one surface thereof a receiving layer comprising an acrylic and/or methacrylic resin.

The invention also provides a method of producing an imagable copy film by forming a receiving layer of an acrylic and/or methacrylic resin on at least one surface of a film substrate of a thermoplastics polymeric material which has a percentage thermal expansion in the film widthwise direction (TD) at 150° C. of 0.01 to 1.0%, and a percentage thermal shrinkage in the film lengthwise direction (MD) at 150° C. of 0.4 to 2.0%.

The substrate of an imagable film according to the invention may be formed from any suitable thermoplastics film-forming polymeric material. Suitable thermoplastics materials include a homopolymer or copolymer of a 1-olefin, such as ethylene, propylene and but-1-ene, a polyamide, a polycarbonate, and, particularly, a synthetic linear polyester which may be obtained by condensing one or more dicarboxylic acids or their lower alkyl (up to 6 carbon atoms) diesters, for example terephthalic acid, isophthalic acid, phthalic acid, 2,5- 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly aliphatic glycols, e.g. ethylene glycol, 1,3-propanediol, 1,4-butanediol, neopentyl glycol and 1,4-cyclohexanedimethanol. A polyethylene teraphthalate film is particularly preferred, especially such a film which has been biaxially oriented by sequential stretching in two mutually perpendicular directions, typically at a temperature in the range 70° to 125°, and preferably heat-set, typically at a temperature in the range 150° to 250°, for example as described in British Pat. No. 838708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4008203, particularly suitable materials being those sold by ICI PLC under the Registered Trade Mark STABAR. Blends of these polymers may also be employed.

The substrate of an imagable copy film according to the present invention may conveniently contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated in the substrate layer, as appropriate.

A substrate intended for use as a projection film should be transparent to permit relatively unrestricted transmission of light during image projection operations. However an opaque or pigmented polymeric substrate may be employed for plain paper copying operations. Thus, a substrate may be pigmented by the application of a pigmented coating layer on a surface thereof, or a substrate may be rendered opaque by incorporation into the film-forming thermoplastics polymer of an effective amount of an opacifying agent. In a further embodiment of the invention the opaque substrate is voided by incorporating into the polymer an effective amount of an agent which is capable of generating an opaque, voided substrate structure. Suitable voiding agents, which also confer opacity, include an incompatible resin filler, a particulate inorganic filler or a mixture of two or more such fillers.

Particulate inorganic fillers suitable for generating an opaque, voided substrate include conventional inorganic pigments and fillers, and particularly metal or metalloid oxides, such as alumina, silica and titania, and alkaline earth metal salts, such as a carbonates and sulphates of calcium and barium. Barium sulphate is a particularly preferred filler which also functions as a voiding agent.

Production of a substrate having satisfactory degrees of opacity, voiding and whiteness requires that the filler should be finely-divided, and the average particle size thereof is desirably from 0.1 to 10 μm provided that the actual particles size of 99.9% by number of the particles does not exceed 30 μm. Preferably, the filler has an average particles size of from 0.1 to 1.0 μm, and particularly preferably from 0.2 to 0.75 μm.

The amount of filler, particularly of barium sulphate, incorporated into the substrate polymer desirably should be not less than 5% nor exceed 50% by weight, based on the weight of the polymer. Particularly satisfactory levels of opacity and gloss are achieved when the concentration of filler is from about 8 to 30%, and especially from 15 to 20%, by weight, based on the weight of the substrate polymer.

The thickness of the film substrate is suitably from 25 to 500, particularly from 50 to 300, and especially from 75 to 175 μm.

In order that the imagable copy film of the present invention has a low distortion, reduced curl and improved flatness (or cockle), it is required that the polymeric substrate has a percentage thermal expansion in the film widthwise direction (TD) at 150° C. of 0.01 to 1.0%, and a percentage thermal shrinkage in the film lengthwise direction (MD) at 150° C. of 0.4 to 2.0%. Preferably the substrate exhibits a TD expansion at 150° C. of 0.2 to 0.8%, and a MD shrinkage at 150° C. of 0.5 to 1.5%, and particularly a TD expansion at 150° C. of 0.3 to 0.5%, and a MD shrinkage at 150° C. of 0.7 to 1.0. If the properties of the substrate are outside the above mentioned ranges, the film will exhibit significant distortion by curling at the edges and having poor flatness, after being used in an electrostatic copying process. The substrate of an imagable copy film of the present invention can be prepared, for examples, during the production of a biaxially drawn film. In a typical process for the production of a biaxially drawn film, the film is preferably firstly stretched in the longitudinal direction over a series of rotating rollers, and then stretched transversely in a stenter over, preferably followed by heat setting under tension in the stenter apparatus. The tension in the widthwise direction can be provided by clips which hold the film, the clips being attached to parallel rails on opposite sides of the stenter apparatus. The tension in the widthwise direction can be reduced or removed, for example by moving the rails inwards towards the exit end of the stenter —this is known as "toe-in". By employing toe-in it is possible to allow the film to shrink to a certain degree, and by this means obtain film with the required TD expansion and MD shrinkage characteristics. The amount of toe-in employed, for example in the production of a polyethylene terephthalate film should be 0.1 to 10%, preferably 3 to 7%, and particularly 3.5 to 6%. The exact amount of toe-in required will depend upon the particular film being produced, and upon the other process conditions being used. It is preferred that the stenter is operated at relatively high temperatures, for example for polyethylene terephthalate film the stenter temperature is suitably 230° C. to 245° C., particularly 235° C. to 240° C.

The receiving layer of an imagable copy film according to the invention comprises a film-forming polymeric resin. Suitable polymers comprise at least one monomer derived from an ester of acrylic acid, especially an alkyl ester where the alkyl group contains up to ten carbon atoms such as methyl, ethyl, n-propyl, isopropyl, n-butyl, isobutyl, terbutyl, hexyl, 2-ethylhexyl, heptyl, and n-octyl. Polymers derived from an alkyl acrylate, for example ethyl acrylate and butyl acrylate, together with an alkyl methacrylate are preferred. Polymers comprising ethyl acrylate and methyl methacrylate are particularly preferred. The acrylate monomer is preferably present in a proportion in the range 30 to 65 mole %, and the methacrylate monomer is preferably present in a proportion in the range of 20 to 60 mole %.

Other monomers which are suitable for use in the preparation of the polymeric resin of the receiving layer, which may be copolymerised as optional additional monomers together with esters of acrylic acid and/or methacrylic acid, and derivatives thereof, include acrylonitrile, methacrylonitrile, halo-substituted acrylonitrile, halo-substituted methacrylonitrile, acrylamide, methacrylamide, N-methylol acrylamide, N-ethanol acrylamide, N-propanol acrylamide, N-methacrylamide, N-ethanol methacrylamide, N-methyl acrylamide, N-tertiary butyl acrylamide, hydroxyethyl methacrylate, glycidyl acrylate, gylcidyl methacrylate. dimethylamino ethyl methacrylate, itaconic acid, itaconic anhydride and half esters of itaconic acid.

Other optional monomers of the receiving layer polymer include vinyl esters such as vinyl acetate, vinyl chloracetate and vinyl benzoate, vinyl pyridine, vinyl chloride, vinylidene chloride, maleic acid, maleic anhydride, styrene and derivatives of styrene such as chloro styrene, hydroxy styrene and alkylated styrenes, wherein the alkyl group contains from one to ten carbon atoms.

A preferred receiving layer polymer, derived from 3 monomers comprises 35 to 60 mole % ethyl acrylate/30 to 55 mole % of methyl methacrylate/2 to 20 mole % of of methacrylamide.

The molecular weight of the receiving layer polymer can vary over a wide range by is preferably within the range 40,000 to 300,000, and more preferably within the range 50,000 to 200,000.

If desired, the receiving layer composition may also contain a cross-linking agent which functions to cross-link the polymeric layer thereby improving adhesion to the polymeric film substrate. Additionally, the cross-linking agent should preferably be capable of internal cross-linking in order to provide protection against solvent penetration. Suitable cross-linking agents may comprise epoxy resins, alkyd resins, amine derivatives such as hexamethoxymethyl melamine, and/or condensation products of an amine, e.g. melamine, diazine, urea, cyclic ethylene urea, cyclic propylene urea, thiourea, cyclic ethylene thiourea, alkyl melamines, aryl melamines, benzo guaniamines, guanamines, alkyl guanamines and aryl guanamines, with an aldehyde, e.g. formaldehyde. A useful condensation product is that of malamine with formaldehyde. The condensation product may optionally be alkoxylated. The cross-linking agent is preferably used in amounts of up to 25% by weight based on the weight of the polymer in the coating composition. A catalyst is also preferably employed to facilitate cross-linking action of the cross-linking agent. Preferred catalysts from cross-linking melamine formaldehyde include ammonium chloride, ammonium nitrate, ammonium thiocyanate, ammonium dihydrogen phosphate, ammonium sulphate, diammonium hydrogen phosphate, para toluene sulphonic acid, maleic acid stabilised by reaction with a base, and morpholinium para toluene sulphonate.

The polymer of the receiving layer composition is generally water-insoluble. The coating composition including the water-insoluble polymer may nevertheless be applied to the polymeric film substrate as an aqueous dispersion or alternatively as a solution in an organic solvent. The coating medium may be applied to an already oriented film substrate. However, application of the coating medium is preferably effected before or during the stretching operation.

In particular, it is preferred that the receiving layer medium should be applied to the film substrate between the two stages (longitudinal and transverse) of a biaxial stretching operation. Such a sequence of stretching and coating is especially preferred for the production of a coated linear polyester film substrate, such as a coated polyethylene terephthalate film, which is preferably firstly stretched in the longitudinal direction over a series of rotating rollers, coated, and then stretched transversely in a stenter oven, preferably followed by heat-setting with the required degree of toe-in.

The receiving layer composition may be applied to the polymeric film as an aqueous dispersion or solution in an organic solvent by any suitable conventional coating technique such as dip coating, bead coating, reverse roller coating or slot coating.

A receiving layer composition applied to the polymeric film substrate is preferably applied as an aqueous dispersion. The temperatures applied to the coated film during the subsequent stretching and/or heat-setting are effective in drying the aqueous medium, or the solvent in the case of solvent-applied compositions, and also, if required, in coalescing and forming the coating into a continuous and uniform layer. The cross-linking of cross-linkable receiving layer compositions is also achieved at such stretching, and preferably at such heat-setting temperatures.

In order to produce a continuous coating, the receiving layer is preferably applied to the polymeric film at a coat weight within the range 0.1 to 10 $mgdm^{-2}$especially 0.2 to 2.0 $mgdm^{-2}$. A discontinuous receiving layer can be produced by applying a coat weight of less than 0.1 $mgdm^{-2}$. Provision of a receiving layer improves the slip properties of the film, and the adhesion of a range of available toner powders to the base film. Modification of the surface of the receiving layer, e.g. by flame treatment, ion bombardment, electron beam treatment, ultra-violet light treatment or preferably by corona discharge, may improve the adhesion of subsequently applied toned powders, but may not be essential to the provision of satisfactory adhesion.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface.

Satisfactory adhesion of a range of toner powders applied directly to the surface of the coated layer can, however, be achieved without any prior surface modification, e.g. by corona discharge treatment. An example of a receiving layer which provides adequate adhesion without corona discharge treatment comprises a terpolymer derived from the following monomers; ethyl acrylate/methyl methacrylate/acrylamide or methacrylamide, conveniently in the approximate molar proportions of 46/46/8 % respectively.

Prior to deposition of the receiving layer onto the polymeric substrate, the exposed surface thereof may, if desired, be subjected to a chemical or physical surface-modifying treatment to improve the bond between that surface and the subsequently applied receiving layer. A preferred treatment, because of its simplicity and effectiveness, is to subject the exposed surface of the substrate to a high voltage electrical stress accompanied by corona discharge. Alternatively, the substrate may be pretreated with an agent known in the art to have a solvent or swelling action on the substrate polymer. Examples of such agents, which are particularly suitable for the treatment of a polyester substrate, include a halogenated phenol dissolved in a common organic solvent e.g. a solution of p-chloro-m-cresol, 2,4-dichlorophenol, 2,4,5- or 2,4,6- trichlorophenol or 4-chlororesorcinol in acetone or methanol.

The ratio of base to receiving layer thickness may vary within a wide range, although the thickness of the receiving layer preferably should not be less than 0.004% nor greater than 10% of that of the base. In practice, the thickness of the receiving layer is desirably at least 0.01 μm and preferably should not greatly exceed about 1.0 μm.

The receiving layer of an imagable copy film according to the present invention may conveniently contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated in the receiving layer, as appropriate. The receiving layer may comprise a particulate filler, such as silica, of small particle size. Desirably, a filler, if employed in a receiving layer, should be present in an amount of not exceeding 50% by weight of polymeric material, and the particle size thereof should not exceed 0.5 μm, preferably less than 0.3 μm, and especially from 0.005 to 0.2 μm. The receiving layer preferably contains 5 to 15% by weight, and particularly 10% of filler (s).

An image layer may be formed on the receiving layer by a conventional electrostatic copying technique using a thermally fusible (thermoplastics) toner powder. Available toner powders include those based on styrene-acrylate copolymers, and blends thereof.

Electrostatic copying machines are well known and generally available for use in office copying operations. Such machines, particularly those which are commercially available under the registered trade mark "Xerox" may be sued for the application of an image to a transparent film substrate in accordance with the invention. Machines of this nature generally operate by initially depositing a uniform positive electrostatic charge from a corona discharge electrode onto a drum having a photoconductive surface, e.g. a selenium coated drum, maintained in a dark environment. The charged surface is then exposed to a light image of the original document or representation to be copied, whereby the charge is dissipated and flows to earth from those areas of the drum struck by light. The charge is not affected in the dark areas masked by the original document or representation. The image is then formed by passing negatively charged coloured thermoplastic toner powder over the light-exposed drum so that the powder is electrostatically attracted to the residual charged areas on the drum surface. The thus-formed toner powder image may be transferred to the film substrate of the invention by placing the receiving layer of the substrate over the toner image and positively charging the substrate by corona discharge so that the toner powder is attracted to the substrate by the residual negative charge on the toner powder. Finally, the substrate may be heated to fuse the toner powder and bond it to the receiving layer surface of the film substrate as an image layer.

Thermal bonding of fusible toner powder to a film substrate is generally effected at relatively high fusion temperatures, for example—at about 200° C. in known electrostatic copying processes, and is commonly achieved by infra-red heating. However, somewhat lower temperatures, in the region of 120° C., applied by heated rollers or ultra-violet lamps, may also be used. It has been found that the adhesion of the toner powder to the film substrate in accordance with the invention is satisfactory at both high and low bonding temperatures.

Imagable copy film of the present invention is suitable for use in other types of copying machines, for example in laser printers.

A receiving layer may be provided on one or each surface of a film substrate, and an image may thus be generated on one or each receiving layer. The invention is of particular utility in the production of paper backed copying film where the non-image surface of the film substrate is laminated along one edge to a backing paper (usually of 40 to 100 gsm gauge) using an adhesive element, such as a thin longitudinal deposit of adhesive (pressure-sensitive or non pressure-sensitive) or tape. The presence of a paper layer in the laminated copy film assembly tends to inhibit transfer of heat to the receiving layer during the thermal bonding stage of the copying process, and therefore effectively impairs toner adhesion. The present receiving medium enables a satisfactorily high level of toner adhesion to be achieved even when a paper backing layer is employed in association with a copying film in accordance with the invention.

When multiple copies are to be produced in a high speed electrostatic copying machine, a finely divided particulate material, such as silica particles, may be incorporated as an anti-blocking agent into the receiving medium. If desired, an antistatic coating medium may be applied to the surface of the film support remote from the image receiving layer. The static friction of the film base can be reduced by applying a was —for example a natural was, such as carnauba wax, or a synthetic wax, to one or both surfaces of the film support, the wax coating on that surface carrying the receiving layer being applied over that layer. These precautions facilitate the feeding of single sheets from a stack of sheets in a high speed copying machine.

The presence of anti-friction medium, such as wax, on the receiving layer is particularly desirable in the case of paper backed laminate copy sheets to be fed in succession from a stack of sheets. Thus, in a stack feed assembly, the image surface of one copy laminate sheet is in contact, in the supply magazine, with the surface of the paper backing sheet of an adjacent copy laminate, and the frictional characteristics of these relatively incompatible surfaces must be controlled so that one laminate slides readily over the other when fed to the copier by the usual belt or suction mechanism. Surprisingly, we have observed that the presence of a wax on the receiving layer does not significantly impair the toner adhesion characteristics.

The invention is illustrated by reference to the following Examples.

EXAMPLES 1-3

A polyethylene terephthalate film was melt extruded, cast onto a cooled rotating drum and stretched in the direction of extrusion to approximately 3.2 times its original dimensions. The cooled stretched film was then coated on both surfaces with an aqueous composition containing the following ingredients:

| | |
|---|---|
| Acrylic resin (16% w/w aqueous based latex of methyl methacrylate/ethyl acrylate/methacrylamide: 44/46/8 mole %, with 25% by weight methoxylated melamine-formaldehyde) | 18.75 liters |
| Ludox TM (50% w/w aqueous silica slurry of average particle size approximately 20 nm, supplied by Du Pont) | 0.43 liters |
| Ammonium nitrate (10% w/w aqueous solution) | 0.20 liters |
| Synperonic N (27% w/w aqueous solution of a nonyl phenol ethoxylate, supplied by ICI) | 0.50 liters |
| Demineralised water | to 100 liters |

the pH of the mixture being adjusted to 9.0 with dimethylamino ethanol (prior to the addition of the Ludox TM).

The coated film was passed into a stenter oven, where the film was dried and stretched in the sideways direction to approximately 3.6 times its original dimension. The biaxially stretched coated film was heat-set at a temperature of about 235° C. with the amount of toe-in being 3, 4 or 5% respectively. Final film thickness was 100 μm, with a dry coat thickness of approximately 300 A, and dry coat weight of approximately 0.03 mgdm$^{-2}$.

The TD and MD expansion or shrinkage was determined by heating strips of the film in an over at 150° C. for 30 minutes. The results are given in Table 1 expressed as average % change of 3 samples.

The originally produced film(s) was cut into A4size sheets, and half of the sheets were backed with paper (as hereinbefore described), and both plain and papered sheets were fed through a Xerox 1025 copier.

Imaged samples were assessed for both curl and flatness. Curl was determined by measuring the height of the corner of each sheet displaying the greatest lift when placed on a horizontal flat surface. The average value of 10 sheets was taken. The results are given in Table 1. Flatness or cockle of the sheets was assessed visually. All the plain and papered samples displayed an adequate degree of flatness.

Sheet feedability was measured by feeding a stack of sheets to the copier, and both plain and papered sheets exhibited uniformly good feeding behaviour.

Adhesion of the toner powder (supplied by Xerox) to the receiver layer was excellent.

EXAMPLE 4

This is a comparative Example not according to the invention.

The procedure of Examples 1-3 was repeated except that no receiver layer was coated onto the film, and no toe-in was utilised in the stenter.

The results of TD and MD expansion or shrinkage, and plain and papered curl are given in Table 1.

Film flatness, sheet feedability and adhesion of the toner powder were significantly worse than Examples 1-3 (and Examples 5-8 below).

EXAMPLES 5-8

The procedure of Examples 1-3 was repeated except that the film was heat set at a temperature of 240° C. and the amount of toe-in was 3, 4, 5 or 6% respectively.

The results of TD and MD expansion or shrinkage, and plain and papered curl are given in Table 1.

Film flatness and sheet feedability were good, and adhesion of the toner powder to the receiver layer was excellent.

EXAMPLE 9

This is a comparative Example not according to the invention.

The procedure of Examples 1-3 was repeated except that no receiver layer was coated onto the film, the film was heat set at a temperature of 240° C., and no toe-in was utilised in the stenter.

The results of TD and MD expansion or shrinkage, and plain and papered curl are given in Table 1.

Film flatness, sheet feedability and adhesion of the toner powder were significantly worse than Examples 1-3 and 5-8.

TABLE 1

| Example No. | Stenter Temp. (°C.) | Toe-in % | TD* Shrinkage | MD Shrinkage | Plain Curl (mm) | Papered Curl (mm) |
|---|---|---|---|---|---|---|
| 1 | 235 | 3 | −0.39 | 0.73 | 1.2 | 12.6 |
| 2 | 235 | 4 | −0.36 | 0.65 | 0.4 | 9.2 |
| 3 | 235 | 5 | −0.41 | 0.74 | 2.2 | 13.2 |
| 4 (Comp.) | 235 | 0 | 0.99 | 0.69 | 3.4 | 18.4 |
| 5 | 240 | 3 | −0.74 | 0.83 | 1.8 | 8.2 |
| 6 | 240 | 4 | −0.53 | 0.91 | 1.6 | 6.4 |
| 7 | 240 | 5 | −0.40 | 0.78 | 2.4 | 6.4 |
| 8 | 240 | 6 | −0.32 | 0.79 | 3.2 | 6.8 |
| 9 (Comp.) | 240 | 0 | 0.96 | 0.84 | 3.4 | 23.4 |

*A negative value indicates thermal expansion.

The above Examples illustrate the improved properties of imagable copy film of the present invention.

I claim:

1. An imagable copy film comprising a film substrate of a thermoplastic polymeric material with a percentage thermal expansion in the film widthwise direction (TD) at 150° C. of 0.1 to 1.0% and a percentage thermal shrinkage in the film lengthwise direction (MD) at 150° C. of 0.4 to 2.0%, having, on at least one surface thereof a receiving layer comprising an acrylic and/or methacrylic resin.

2. A copy film according to claim 1 wherein the substrate has a percentage thermal expansion in the film widthwise direction (TD) at 150° C. of 0.2 to 0.8%, and a percentage thermal shrinkage in the film lengthwise direction (MD) at 150° C. of 0.5 to 1.5%.

3. A copy film according to claim 2 wherein the acrylic resin comprises a terpolymer of methyl methacrylate/ethyl acrylate/acrylamide or methacrylamide.

4. A copy film according to claim 1 comprising a finely-divided particulate material in the receiving layer.

5. A copy film according to claim 4 wherein the particulate material comprises silica.

6. A copy film according to claim 1 comprising a backing paper bonded to a non-imaged surface of the film substrate.

7. A copy film according to claim 1 comprising a wax layer on tne receiving layer.

8. A copy film according to claim 1 wherein the substrate comprises a biaxially oriented film of polyethylene terephthalate.

* * * * *